Aug. 27, 1929.  C. J. CARLISLE  1,726,257
AUTOMOBILE WARDROBE
Filed Oct. 14, 1927  2 Sheets-Sheet 1
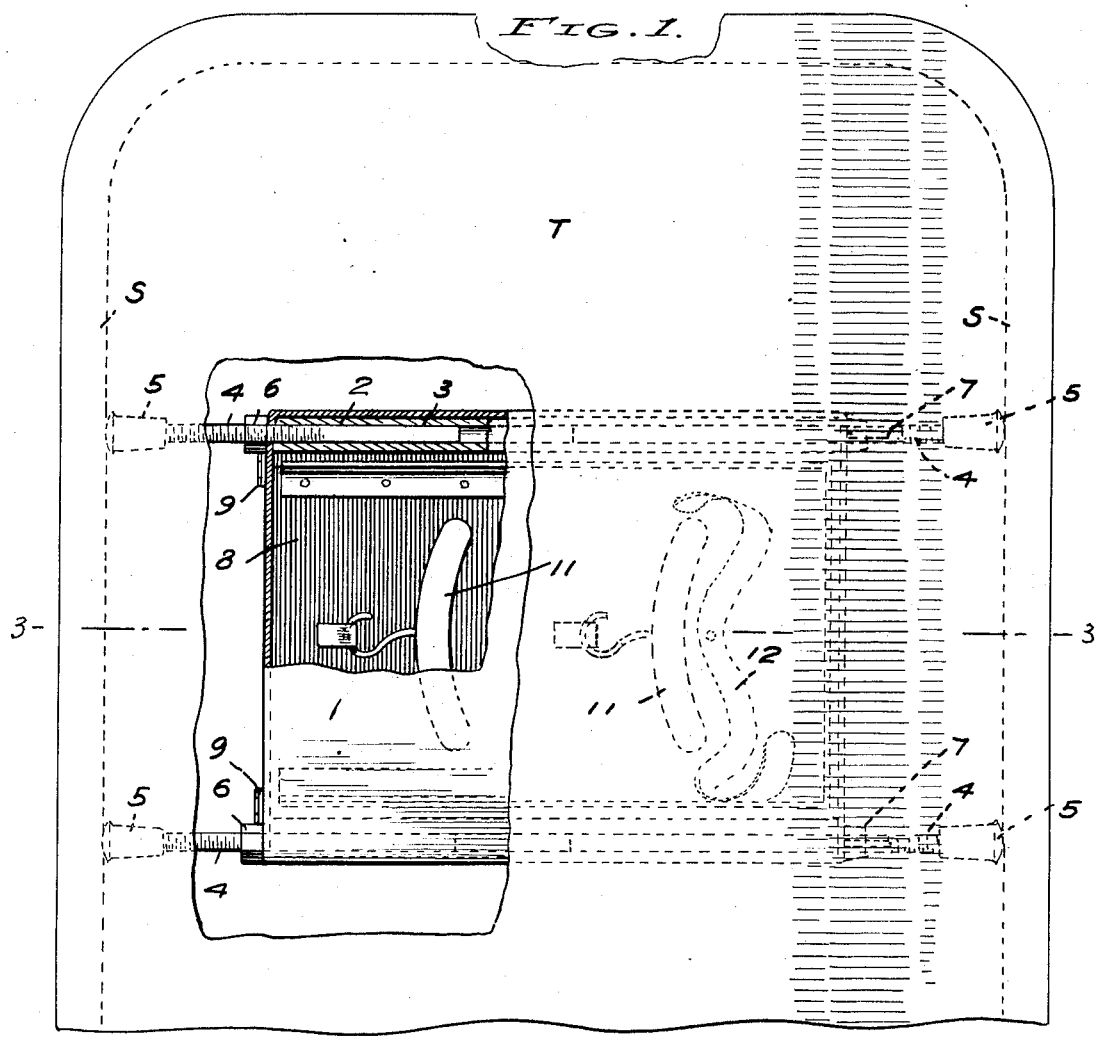
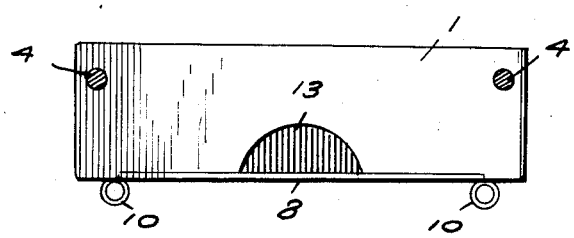
C. J. Carlisle
Inventor Aug. 27, 1929.  C. J. CARLISLE  1,726,257
AUTOMOBILE WARDROBE
Filed Oct. 14, 1927  2 Sheets-Sheet 2
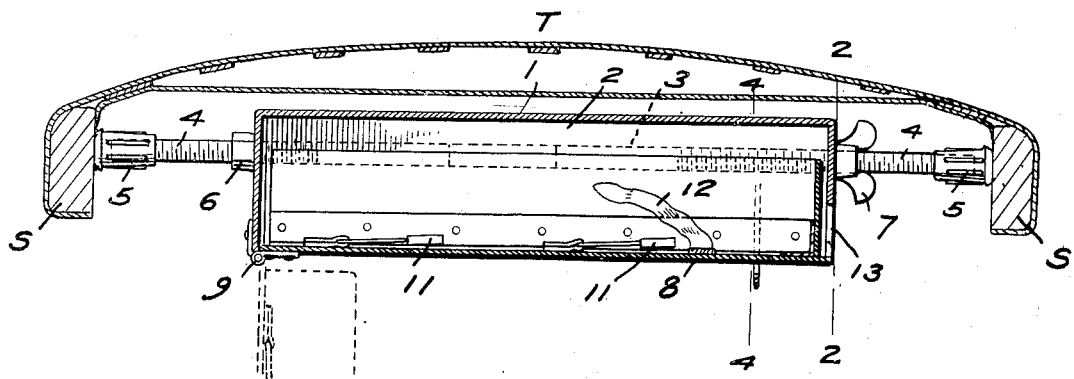
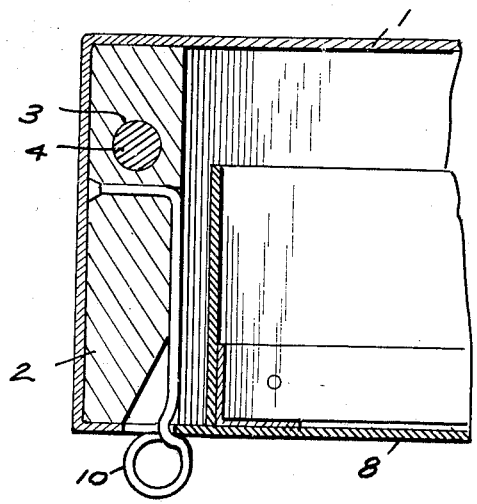
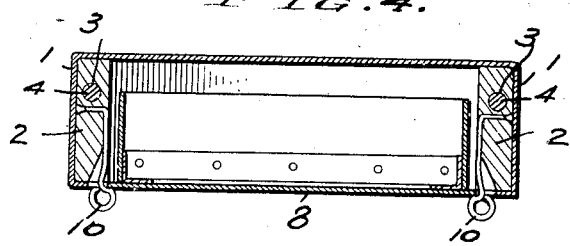
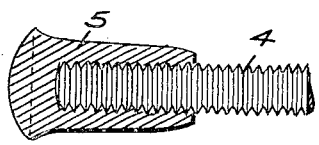
C. J. Carlisle
Inventor
By C.A.Snow&Co.
Attorneys.

Patented Aug. 27, 1929.

1,726,257

UNITED STATES PATENT OFFICE.

CHARLES J. CARLISLE, OF COLDWATER, MICHIGAN.

AUTOMOBILE WARDROBE.

Application filed October 14, 1927. Serial No. 226,191.

This invention relates to wardrobes designed primarily for use in automobiles, one of the objects being to provide a simple, light and compact structure of this character designed to be securely fastened to the top of the automobile where it will be out of the way but where it can be reached readily when it is desired to open the wardrobe to obtain access to the contents thereof.

A further object is to provide simple and efficient means for connecting the wardrobe to automobile tops of different widths.

A further object is to provide a wardrobe the container portion of which is adapted to swing downwardly so as to be suspended where the articles contained therein can be easily reached.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a top plan view of a portion of an automobile top, a part thereof being broken away to show the wardrobe in position thereunder, a portion of the top of the wardrobe being also broken away.

Figure 2 is an end elevation of the wardrobe, the supporting rod being shown in section.

Figure 3 is a section on line 3—3, Figure 1.

Figure 4 is a section on line 4—4, Figure 3.

Figure 5 is an enlarged section through one side portion of the wardrobe showing one of the latches used for holding the wardrobe closed.

Figure 6 is a section through one of the gripping heads of a supporting groove.

Referring to the figures by characters of reference 1 designates the main housing of the wardrobe which is preferably formed with an open bottom and the front and back portions of this housing are reinforced by strips 2 arranged in the housing and secured thereto in any manner preferred. Each of these strips has a longitudinal bore 3 and arranged within each end portion of each bore is a screw threaded stem 4 the outer end of which is in engagement with a gripping head 5 which can be formed of rubber or other resilient material. The threaded stems 4 are screwed into the bores 3 and are adapted to be held in any position to which they may be moved by means of lock nuts 6 bearing against the ends of the housing 1. The lock nuts at one end of the housing can be in the form of wing nuts as shown at 7 in Figure 3. Obviously by loosening the nuts 6 and 7 the threaded stem 4 can be adjusted outwardly or inwardly relative to the housing 1 so that said housing will be supported centrally beneath the top T of an automobile when the heads 5 are in contact with the sides S of the top. After this adjustment has been effected the nuts 6 at one end of the wardrobe can be tightened to hold against rotation those stems 4 engaged thereby. The other nuts 7 can be loosened to permit their stems to be rotated to feed into the reinforcing strips 2. Thus the housing 1 with the threaded stems 4 projecting therefrom can readily be positioned under the top T between the sides S after which the stem engaged by the wing nuts can be adjusted longitudinally to force their heads 5 tightly against the adjacent side heads. Thus all of the heads 5 will be clamped against the sides of the top with sufficient firmness to support the wardrobe in position. Thereafter the nuts 7 can be tightened to lock the threaded stems against rotation.

Hingedly connected to the housing 1 is a container 8. The hinge is shown at 9 and is preferably located adjacent one end of the container. Spring latches 10 are connected to the reinforcing strips 2 adjacent the other end of the housing and are adapted to snap into engagement with opposed edges of the bottom of the container 8 when said container is moved upwardly to closed or housed position as shown in Figures 3, 4 and 5.

The container 8 can be provided with any desired fittings such as common hangers 11, straps 12 and other equipment usually found in a wardrobe trunk. Obviously, therefore, garments can be packed readily within the container 8 while said container is suspended in a substantially vertical position as shown in Figure 3 by broken lines. Thereafter the container can be swung upwardly into the housing 1 where it will be engaged by the latches 10 and supported.

A structure such as described is very simple and compact and is advantageous because of the ease with which it can be applied to an automobile top where it will be supported out of the way. However whenever it is desired to obtain access to the contents of the wardrobe it merely becomes necessary to disengage the latch 10 from the container 8 whereupon said container can be swung downward to the dotted line position shown in Figure 3.

As shown in Figure 2 the housing 1 can be cut away at one end to provide a finger receiving recess 13 whereby the end of the container 8 can be easily gripped and pulled downwardly against the action of the latch 10.

What is claimed is:

1. A device of the class described including a housing having parallel bores extending within opposed walls thereof, threaded stems within the end portions of each bore and extending in opposite directions from the housing, resilient gripping heads at the outer ends of the stems, said stems being adjustable outwardly from the bores to force the heads into frictional contact with spaced rigid supporting structures between which the housing is located, said housing constituting means for transmitting thrust from one threaded stem to the other.

2. The combination with a rigid structure having spaced supporting members, of a housing having bores extending longitudinally within opposed walls, threaded stems seated in the respective end portions of each bore and projecting in opposite directions from the bore, a resilient gripping head at the outer end of each stem, said stems being adjustable longitudinally relative to the housing to force the heads into frictional engagement with the supporting structures, said housing constituting means for transmitting thrust from the stems at one side of the housing to the stems at the opposite side thereof, and lock nuts upon the stems adjustable against the housing for holding the stems against accidental rotation.

3. The combination with a rigid structure having spaced supporting members, of a housing having bores extending longitudinally within opposed walls, threaded stems seated in the respective end portions of each bore and projecting in opposite directions from the bore, a resilient gripping head at the outer end of each stem, said stems being adjustable longitudinally relative to the housing to force the heads into frictional engagement with the supporting structures, said housing constituting means for transmitting thrust from the stems at one side of the housing to the stems at the opposite side thereof, lock nuts upon the stems adjustable against the housing for holding the stems against accidental rotation, and a closure hingedly connected to and constituting the bottom of the housing.

In testimony that I claim the foregoing as my own, I have hereto affixed my signature.

CHARLES J. CARLISLE.